United States Patent [19]
Hatting et al.

[11] Patent Number: 5,634,486
[45] Date of Patent: Jun. 3, 1997

[54] VALVE ASSEMBLY WITH CONNECTION BETWEEN AN ANGULARLY DISPLACEBLE MEMBER AND ACTUATOR

[75] Inventors: Paul Hatting; Günter Naasner, both of Kempen, Germany

[73] Assignee: ITT Richter Chemie-Technik GmbH, Kempen, Germany

[21] Appl. No.: 305,488

[22] Filed: Sep. 13, 1994

[30] Foreign Application Priority Data

Sep. 13, 1993 [DE] Germany .................. 43 30 819.8

[51] Int. Cl.$^6$ .................. F16K 43/00; F16K 41/04
[52] U.S. Cl. .................. 137/315; 251/58; 251/214; 251/292; 217/112; 217/123; 403/361; 403/383
[58] Field of Search .................. 251/14, 58, 214, 251/292, 291; 403/357, 360, 361, 380, 381, 383; 137/315; 277/110, 111, 112, 123, 124, 125

[56] References Cited

U.S. PATENT DOCUMENTS

| | | | |
|---|---|---|---|
| 2,138,530 | 11/1938 | Wagner | 251/292 |
| 2,969,250 | 1/1961 | Kull | 403/361 |
| 3,080,185 | 3/1963 | Walker | 403/383 |
| 3,239,191 | 3/1966 | Widera | 251/214 |
| 3,458,172 | 7/1969 | Burrows | 251/214 |
| 3,650,506 | 3/1972 | Bruton | 251/58 |
| 4,046,350 | 9/1977 | Massey et al. | 251/58 |
| 4,270,849 | 6/1981 | Kalbfleisch | 251/292 |
| 4,469,016 | 9/1984 | Butler et al. | 251/58 |
| 4,538,790 | 9/1985 | Williams et al. | 251/214 |
| 4,633,897 | 1/1987 | Effenberger | 251/292 |
| 4,763,874 | 8/1988 | Ogawa | 251/214 |
| 4,813,648 | 3/1989 | Walton et al. | 251/214 |
| 4,869,459 | 9/1989 | Bourne | 251/58 |
| 4,887,634 | 12/1989 | Killian | 251/292 |
| 4,940,208 | 7/1990 | Kemp | 251/214 |
| 4,972,867 | 11/1990 | Ruesch | 251/214 |
| 5,135,329 | 8/1992 | Yuda | 403/361 |
| 5,203,370 | 4/1993 | Block et al. | 251/214 |

FOREIGN PATENT DOCUMENTS

| | | |
|---|---|---|
| 0123421 | 10/1984 | European Pat. Off. . |
| 0353158 | 1/1990 | European Pat. Off. . |
| 2438875 | 2/1976 | Germany . |
| 2530347 | 1/1977 | Germany . |

*Primary Examiner*—George L. Walton
*Attorney, Agent, or Firm*—Herbert Dubno; Yuri Kateshov

[57] ABSTRACT

A coupling member between a valve driver and a valve has a pin extending into the valve driver shaft and a head with a groove receiving the shaft of the valve and a recess accommodating the packing nut thereof. A spring braced between the coupling member and the valve driver allows the coupling member to be lifted from the nut for tightening thereof.

20 Claims, 4 Drawing Sheets

VALVE ASSEMBLY WITH CONNECTION BETWEEN AN ANGULARLY DISPLACEBLE MEMBER AND ACTUATOR

FIELD OF THE INVENTION

The present invention relates to a valve assembly and, more particularly, to a valve assembly having a valve with an angularly displaceable valve member, i.e. a valve member which is angularly displaceable in full rotation or by partial angular displacement, via an actuating member and to the connection between the angularly displaceable valve member and a valve driver.

BACKGROUND OF THE INVENTION

It is known, for remote actuation of valves, especially valves with angularly displaceable valve members, i.e. valve members which are brought from closed to open position and vice versa by a full rotation or a swinging movement, to provide electrically, pneumatically or other valve drivers. The valve driver is as a rule provided with an intervening part mounted upon the valve housing and generally also referred to as a housing, for example, as a connecting housing, which can be bolted onto the housing of the valve driver and to the body of the valve.

The output shaft of the valve driver and the actuating shaft of the valve member are usually coupled together in the connecting housing by a threaded connection, a pin or a plug and socket connection which have tolerances due to fabrication.

The valves generally must be capable of withstanding highly aggressive and corrosive substances and must be capable of maintaining the seal or tightness against high pressures. For these reasons, the valve can be provided with seal or other packings around the actuating shaft preventing the escape of fluid.

The packing can be compressed by a packing bushing, ring or sleeve and corresponding screws which adjust the position of the packing bushing or can be clamped by a central packing nut.

The packing bushing or nut can be braced directly against a pressure ring or washer which bears upon the packing or can compress the spring stack which bears against the packing bushing, washer or packing itself.

The central packing nut can have an external thread engaged with an internal thread which can be threaded onto the external thread of the valve shaft.

In practically all of the prior art constructions, the packing nut must be provided with a counternut to prevent involuntary loosening of the packing nut from the valve shaft. Security against loosening of the nut is also required since the entrainment of the nut with the shaft creates relative movement between the nut and the stationary packing rings. As a result of the valve requirements described above, the parts of the valve must be fabricated with relatively close tolerances and that applies as well to the coupling parts between the driver and the actuating shaft.

In the past, partly as a result of these high tolerance requirements and partly because it has not been possible to reliably prevent loosening of the packing nuts, the operation of such valves has required from time to time, time-consuming retightening of the packing nuts which has necessitated the interruption in valve service which generally results in the falling off in production.

Furthermore, conventional and earlier coupling arrangements between the valve driver and the valve of such an assembly has involved very high fabrication costs.

OBJECTS OF THE INVENTION

It is, therefore, the principal object of the present invention to provide an improved valve assembly which eliminates these drawbacks, simplifies the connection between the driver and the valve and eliminates the need for close tolerances.

Another object of the invention is to provide an improved connection between a valve driver and a valve which can be of low fabrication tolerance and thus is comparatively inexpensive but yet satisfies the requirements for reliable valve actuation.

Another object of the invention is to provide a connection for the purposes described that enables adjustment of the backing nut, i.e. tightening thereof, even while the valve is in operation and nevertheless eliminates the need for a counternut.

SUMMARY OF THE INVENTION

These objects are attained, in accordance with the invention, by providing on the coupling part a spring element which presses the coupling part toward the valve. The special advantage of this arrangement resides in the fact that the coupling part plus the valve enables compensation of the fabrication tolerances, especially those of the coupling part, in a particularly convenient manner. The use of the spring element prevents slipping of the coupling part when it is used with different installation positions. In the case of thermal expansion and contraction or dimensional changes during wear, the spring element functions compensatorily which ensures high operational reliability and longer useful life of the valve.

More particularly, a valve assembly according to the invention can comprise:

- a valve having an angularly displaceable valve member, and an actuating shaft connected to the valve member;
- a valve driver provided with a drive for angularly displacing the valve member and with an output shaft of the drive;
- a connecting housing between the valve and the valve driver and interconnecting the valve and the valve driver, the actuating shaft and the output shaft extending into the connecting housing;
- a coupling member releasably angularly connecting the shafts together in the connecting housing; and
- a spring element mounted on the coupling member and urging the coupling member toward the valve.

The spring element according to the invention can be coaxially mounted on the shaft-like end of the coupling part turned away from the valve. The spring element is preferably a coil compression spring. This has the advantage that the coil compression spring can be shoved over the shaft so that it is held in position by the shaft. Additional positioning or guidance of the spring is thus not necessary.

Preferably the spring element is braced at one end against the coupling part and its opposite end against a side of the valve driver turned toward the valve. The spring element is thus braced between the two parts which in any event are required for the valve assembly.

According to a feature of the invention for the connection of the coupling part with the valve shaft, the side of the coupling part turned toward the valve has a first recess in which the outer end of the valve or actuator shaft is form-fittingly received. This recess is preferably formed as a groove with two parallel sides, easily fabricated by milling of the workpiece forming the connecting member. In combination with the valve element, of which a connecting piece can therefore provide a particularly simple and reliable connection between the driver and the valve shaft. Screws, pins and other elements hitherto necessary to effect the connection can be entirely eliminated.

To ensure secure arresting of the packing nut, the coupling part can be formed with a second recess in which the packing nut is form-fittingly received. This second recess can also be provided as a groove having two parallel sides engageable with parallel sides of the nut. In this construction, the packing nut is secured against rotation relative to the valve shaft and the usual counternut can be eliminated together with other means which have hitherto been provided to prevent or limit rotation of the packing nut. If the packing nut requires tightening, the coupling part can be displaced against the force of the spring element to release the shaft and disengage the packing nut or simply to clear the packing nut and allow it to be rotated relative to the shaft. For that purpose, the engagement between the shaft portion of the coupling member and the recess in the output shaft of the driver in which the shaft portion of the coupling member is engaged should allow the axial play which enables the coupling member to disengage from the packing nut for the tightening thereof. The spring means can compensate for the tightening of the packing nut.

According to another feature of the invention, the first recess or groove extends at a right angle to the second recess or groove. Under load this ensures a uniform distribution of the radial forces in the coupling part and thus prevents radial shifting of the coupling in the direction of the open ends of the grooves. Of course any other relative angular orientations of the two recesses can be adopted as desired.

The first recess extends more deeply into the coupling member than the second recess. The coupling member thus has a plurality of functions. It not only provides reliable engagement of the valve shaft but it also ensures fixing of the packing nut relative thereto. The screwthread on the packing nut and the corresponding thread on the shaft of the valve are not stressed because the coupling member secures the two angularly together so that even in long-term operation, the packing nut can be readjusted as required without fear that the screw threads will have been damaged.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
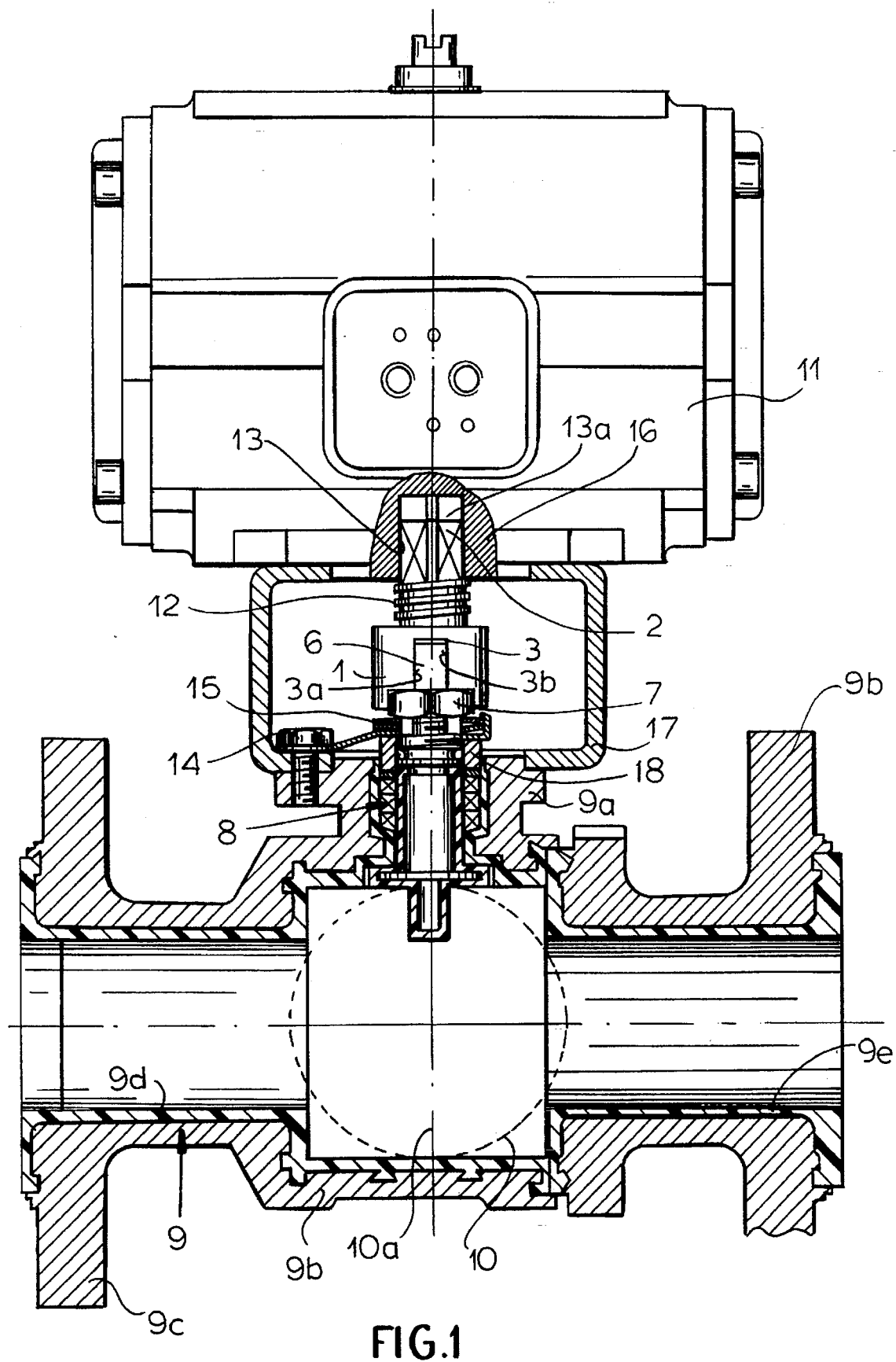
FIG. 1 is a cross sectional view through a valve and the connecting parts to the driver which has been shown largely in elevation, in accordance with the invention.
Figure 1A:
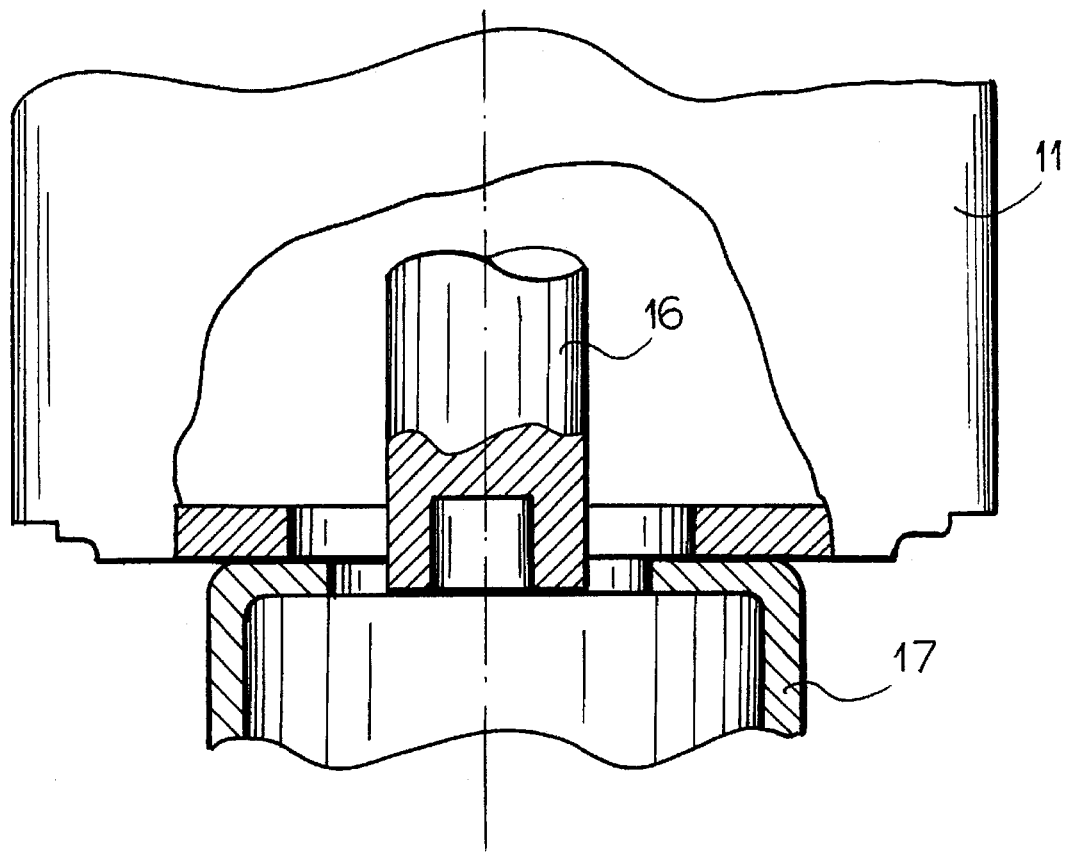
FIG. 1a is a detailed view drawn to an enlarged scale of a portion of the device of FIG. 1, partly broken away.

FIG. 1 shows a ball valve 9 which is provided with a remote-controlled valve driver 11. The valve driver 11 is connected by screws, not shown, to an intermediate or connecting housing 17 which, in turn, is bolted to a flange 9a of a body 9b of the valve. The body 9b has, in turn, flanges 9c and 9d for connecting the valve in an appropriate pipeline and the valve passage 9d is provided with a lining 9d of corrosion-resistant material.

The valve member within this passage is a ball 10 whose opening can be aligned with the inlet and outlet portions of the passage or disaligned therefrom upon rotation or angular movement of the ball 10 about the axis 10a to open and close the valve respectively.

The valve ball 10 is provided with an actuating shaft 6 which projects into the connecting housing 17. The valve driver 11, including a mechanism for rotating the ball 10 through a full rotation or a partial rotation about the axis 10a, has a drive shaft 16 which also reaches into the housing 17.

Figure 2:
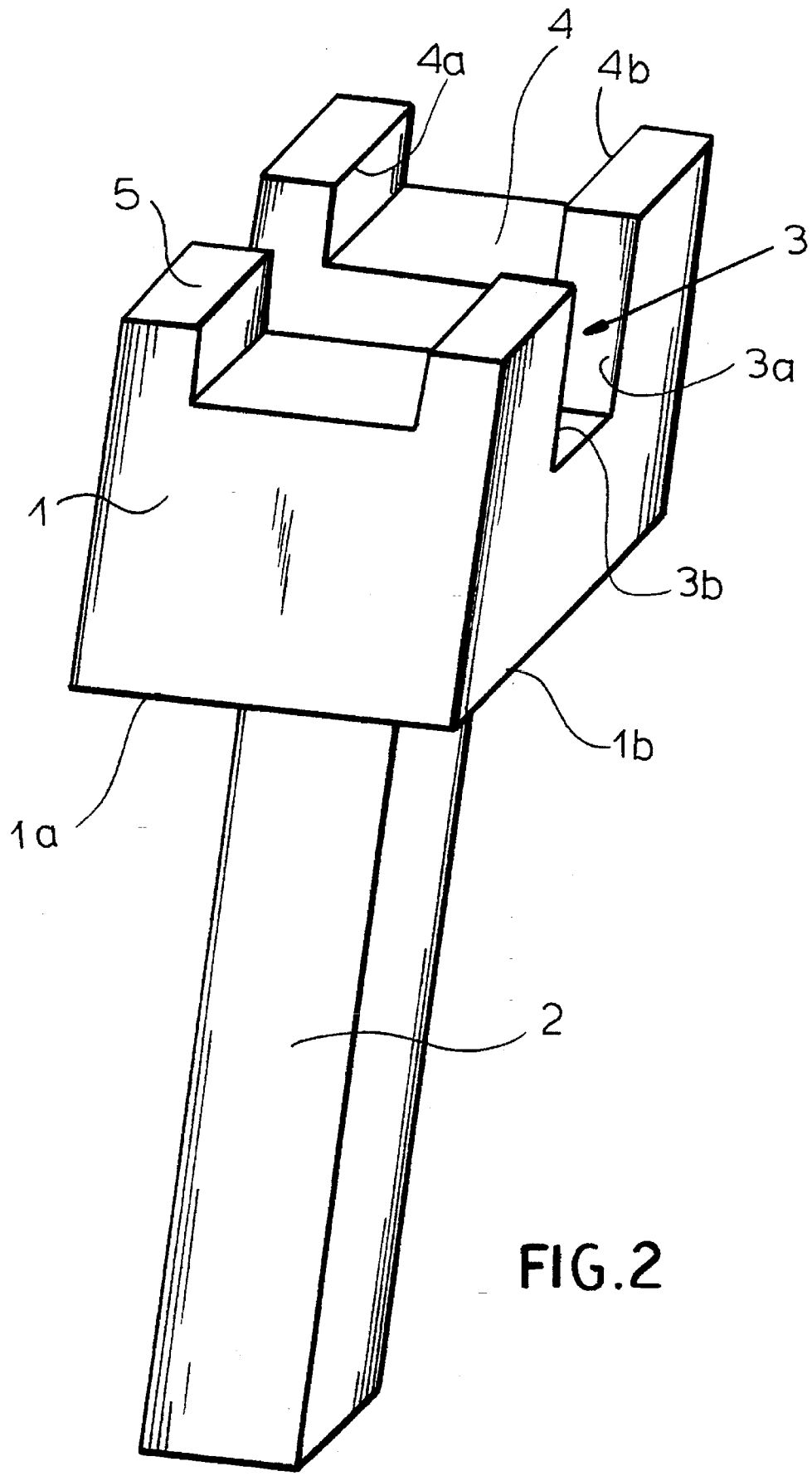
FIG. 2 is a perspective view of a coupling member which can be used in accordance with the invention.

A coupling member 1, 2 has an upper shaft or pin-forming end 2 of noncircular configuration engaged in a recess 13 in the drive shaft 16 of the valve driver 11. In the embodiment illustrated in FIGS. 1 and 2, the recess 13 is of square cross section and the end 2 of the coupling member 1, 2 is of corresponding and complementary shape. The axial length or height of the recess 13 is greater than the axial extent of the pin-shaped end 2 projecting into the recess so that free space 13a is provided above the pin-shaped end 2.

On the pin-shaped end 2 of the coupling member 1, 2, we provide a spring element 12, especially a coil compression spring, which is coaxial with the pin-shaped end 2. The degree to which the spring can be compressed and the length of the pin-shaped end 2 are so dimensioned that the free space 13a remains in the operating state of the system so that an axial movement of the pin-shaped end 2 into the space 13a will allow the opposite end 1 to be lifted from the nut 7 so that the nut can be rotated for tightening or adjusting of this member.

More particularly, surrounding the shaft 6 within the body 9b of the valve is a packing 8 formed by a multiplicity of packing rings and compressed by a packing sleeve 18 against which a stack of belleville or dished-disk spring washers 15 can bear. The stack of dished-disk washers is compressed by the packing nut 7 threaded onto the shaft 6.

As noted, the region 2 of the coupling member 1,2 has a square cross section which form-fittingly engages in the drive shaft 16 of the valve driver. However, the region 2 need not have a square cross section as long as the region 2 is form fitting with the shaft 16 and the connection between the coupling member 1, 2 and the shaft 16 is able to transmit torque.

The region 1 of the coupling member 1, 2, also referred to as the coupling head, has a larger cross section against which the spring 12 is seated so that the spring 12 is braced between the coupling head and the underside of the valve driver or the inner side of the connecting housing 17.

Figure 6:
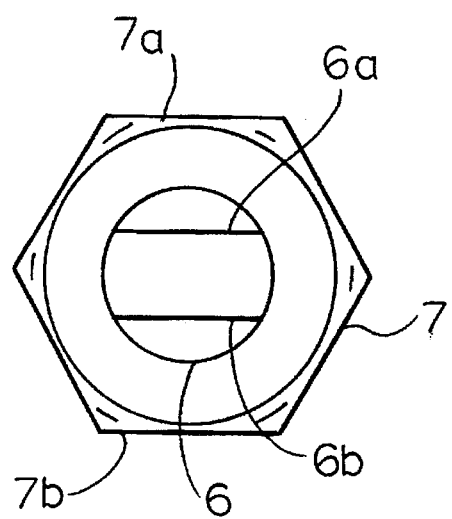
FIG. 6 is an end view of the actuating shaft of the valve and the nut which can be engaged by a coupling member as illustrated in FIGS. 1–5.

The coupling head 1 is formed with a first groove 3 extending transversely to the axis of the shaft 6 and form-fittingly receiving the end of the valve shaft 6 turned away from the valve member and toward the valve driver 11. This end of the shaft 6 can have a dihedral formed by parallel surfaces 6a and 6b (FIG. 6) or can be of rectangular cross section, the parallel sides 6a and 6b slidably fitting against the longitudinal sides 3a and 3b of the recess 3 in which the end of the shaft is engaged. This ensures that the coupling member 1, 2 can transmit torque to the shaft 6 which is connected with the valve member 10 with a minimum of play.

In a second recess 4 of the coupling head 1 which also extends perpendicular to the axis of the shaft 6 and is formed as a groove, the packing nut 7 is engaged. The recess 3 projects more deeply into the coupling head 1 than the recess 4. It should be noted that the shaft 6 should be able to extend the recess 3 sufficiently to enable the nut 7 to be engaged in the recess 4 under all circumstances so that the coupling member 1, 2 will thereby prevent undesired rotation of the nut 7 on the shaft 6.

The stack of spring disks 15 serves as a bearing between the nut 7, the compression ring 18 and the packing 8.

FIG. 8 shows the coupling member 1, 2 with its recesses 3 and 4 open at the end 5 turned toward the valve.

While in a preferred embodiment the coupling head 1 and the pin 2 of the coupling member 1, 2 have rectangular, especially square outer cross sections with the cross sectional area of the head 1 being greater than that of the pin 2, other configurations are suitable. For example, the coupling head 1 can have a cylindrical or ball-shaped configuration as long as the coil spring 12 can effectively brace against it.

The coil spring 12 is coaxially mounted on the pin 2 and is braced at one end against the coupling head 1, the outer diameter of the coil spring 12 is preferably less than the length of the sides 1a, 1b of the coupling head 1.

Each of the recesses 3 and 4 is formed as a groove with respective parallel sides. Such grooves can be easily milled in the workpiece and thus fabricated at low cost. For stability, the grooves may be perpendicular to one another although they can lie at different angles to one another. The groove 3 is milled more deeply into the coupling head 1 than the groove 4. The sides 3a and 3b of the groove 3 are spaced apart by a smaller distance than the sides 4a and 4b which receive parallel flanks of the nut 7 between them.

The ratio of the outer diameter of shaft 6 and nut 7 is so matched with respect to the dimensions of the recesses 3, 4 (and vice versa) that the nut 7 is received in the recess 4 so as to be held against rotation while the shaft 6 is held against rotation in the recess 3.

Figure 3:
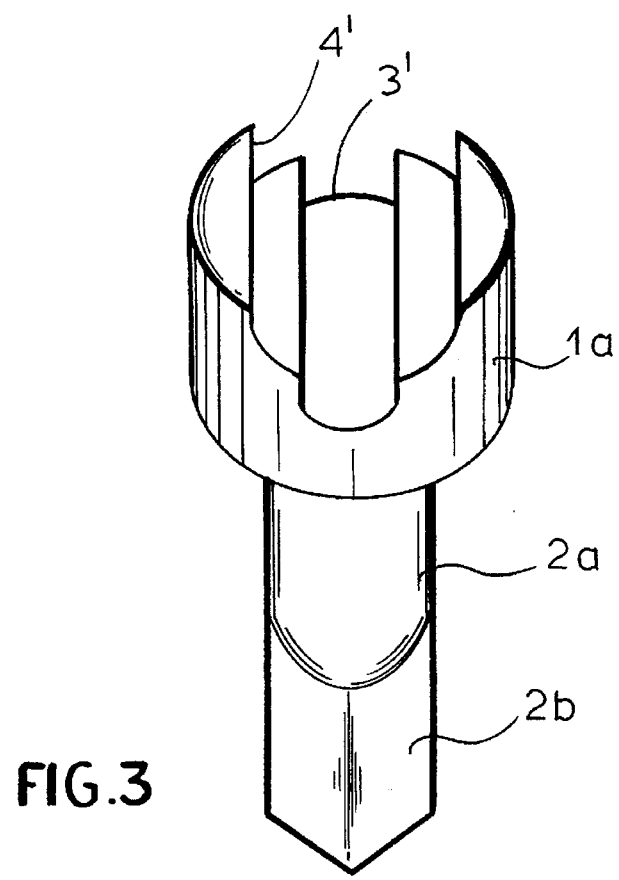
FIGS. 3, 4 and 5 are perspective views of the recessed end of other coupling members.

FIG. 3 shows an embodiment in which the coupling head 1a and the pin 2a of the coupling part 1a, 2a are of cylindrical configuration and the grooves 3' and 4' are aligned with one another. The end of the pin 2a is provided with a region 2b of square cross section.

Figures 4, 5:
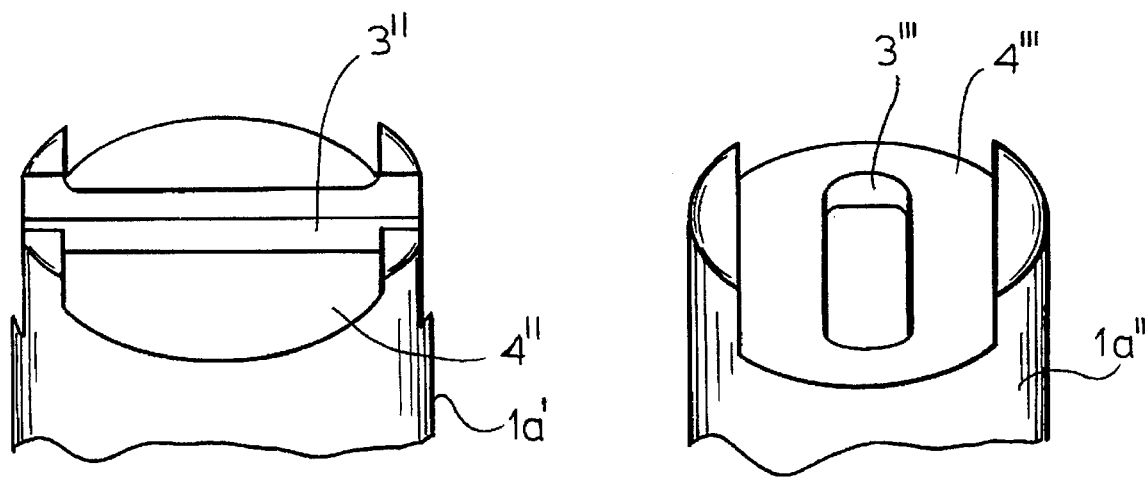

In FIG. 4, the groove arrangement 3", 4" has been modified in the cylindrical head 1a' so that the grooves are perpendicular to one another. The recesses 3' and 3" extend more deeply in the head 1a, 1a' than the grooves 4' and 4".

FIG. 5 shows an embodiment in which the recess 3''' in the cylindrical head 1a" is a pocket which does not extend through the head 1a" longitudinally to accommodate a shaft end of complementary cross section. The groove 4''', however, is parallel to the longitudinal axis of the recess 3'''. However any other relative angular orientation of the grooves and recesses can be used.

We claim:

1. A valve assembly, comprising:

a valve having an angularly displaceable valve member, and an actuating shaft connected to said valve member and rotatable about an axis;

a valve driver provided with an output shaft rotatable about said axis and spaced axially from said actuating shaft for angularly displacing said valve member;

a connecting housing mounted between said valve and said valve driver and interconnecting said valve and said valve driver, said actuating shaft and said output shaft extending into said connecting housing;

a coupling member received in said connecting housing and removably attached between the actuating shaft and said valve driver, said coupling member releasably angularly connecting said shafts together in said connecting housing for transmitting a torque from said output shaft to said actuating shaft; and a spring element mounted on said coupling member within said housing and releasably and operatively urging said coupling member toward said valve and around at least an end portion of said actuating shaft, said spring element being braced at one end thereof against said coupling member and directly against an underside of said output shaft at the other end thereof to rotate synchronously therewith thereby allowing adjustment of said coupling member relative to said actuating shaft.

2. The valve assembly defined in claim 1 wherein said coupling member has an axially extending end turned away from said valve, said spring element being mounted coaxially on said end.

3. The valve assembly defined in claim 2 wherein said spring element is a coil compression spring.

4. The valve assembly defined in claim 1 wherein said coupling member is formed in one piece between said shafts.

5. The valve assembly defined in claim 1 wherein said coupling member has a side turned toward said valve and formed with a first recess formfittingly receiving an outer end of said actuating shaft.

6. The valve assembly defined in claim 5 wherein said outer end of said actuating shaft is formed as a dihedral and said recess is a groove receiving said dihedral.

7. The valve assembly defined in claim 6 wherein said dihedral has two mutually parallel surfaces.

8. The valve assembly defined in claim 5 wherein said side of said coupling member turned toward said valve is further formed with a second recess formfittingly receiving a nut threaded onto said actuating shaft and being disposed between said first recess and said outer end of the actuating shaft, so that said coupling member prevents voluntary rotation of said nut on said actuating shaft.

9. The valve assembly defined in claim 8 wherein said valve is provided with a stack of dished-disk springs, said nut bearing upon said stack.

10. The valve assembly defined in claim 9 wherein said valve is provided with packing surrounding said shaft, said stack of dished-disk springs bearing upon said packing.

11. The valve assembly defined in claim 8 wherein said second recess lies with two parallel surfaces against two parallel sides of the nut.

12. The valve assembly defined in claim 8 wherein said first recess is perpendicular to the second recess.

13. The valve assembly defined in claim 8 wherein said first recess extends more deeply into the coupling member than the second recess.

14. The valve assembly defined in claim 8 wherein said recesses have longitudinal extents transverse to the longitudinal axis of the coupling member.

15. A valve assembly, comprising:

a valve having an angularly displaceable valve member, and an actuating shaft connected to said valve member and rotatable about an axis;

a valve driver provided with an output shaft rotatable about said axis and spaced axially from said actuating shaft for angularly displacing said valve member;

a connecting housing mounted between said valve and said valve driver and interconnecting said valve and said valve driver, said actuating shaft and said output shaft extending into said connecting housing;

a coupling member releasably angularly connecting said shafts together in said connecting housing and removably attached between the actuating shaft and said valve driver, said coupling member releasably angularly connecting said shafts together in said connecting housing for transmitting a torque from said output shaft to said actuating shaft and having a side turned toward said valve and formed with:
- a first recess formfittingly receiving an outer end of said actuating shaft, and
- a second recess formfittingly receiving a nut threaded onto said actuating shaft and being disposed between said first recess and said outer end of the actuating shaft, said first recess extending more deeply into the coupling member than the second recess, so that said coupling member prevents voluntary rotation of said nut on said actuating shaft; and
- a spring element mounted on said coupling member and urging said coupling member toward said valve wherein said spring urges said first and second recesses around said outer end of said actuator shaft and said nut for allowing at least one of adjustment and tightening of said coupling member and said nut relative to said outer end of said actuating shaft.

16. The valve assembly defined in claim 15 wherein said coupling member has an axially extending end turned away from said valve, said spring element being mounted coaxially on said end.

17. The valve assembly defined in claim 15 wherein said spring element is a coil compression spring.

18. The valve assembly defined in claim 15 wherein said coupling member is formed in one piece between said shafts.

19. The valve assembly defined in claim 15 wherein said coupling member has a side turned toward said valve and formed with a first recess formfittingly receiving an outer end of said actuating shaft.

20. The valve assembly defined in claim 15 wherein said outer end of said actuating shaft is formed as a dihedral and said recess is a groove receiving said dihedral.

* * * * *